US007266878B1

(12) United States Patent
Sullivan

(10) Patent No.: US 7,266,878 B1
(45) Date of Patent: Sep. 11, 2007

(54) IDC TOOL WITH EXTENDED REACH

(76) Inventor: Robert W. Sullivan, 3310 Los Nogales Rd., Simi Valley, CA (US) 93063

(*) Notice: Subject to any disclaimer, the term of this patent is extended or adjusted under 35 U.S.C. 154(b) by 0 days.

(21) Appl. No.: 11/655,676

(22) Filed: Jan. 19, 2007

(51) Int. Cl.
*B23P 23/00* (2006.01)
*B23P 19/00* (2006.01)

(52) U.S. Cl. ...................... 29/566.4; 29/33 M; 29/750; 29/758; 81/177.1; 81/177.85; 81/463

(58) Field of Classification Search ............... 29/566.4, 29/33 M, 566.3, 566.1, 861, 866, 564.7, 564.8, 29/749, 750, 751, 752, 753, 758, 278; 81/177.1, 81/177.2, 177.85, 180.1, 184, 463
See application file for complete search history.

(56) References Cited

U.S. PATENT DOCUMENTS 2,960,864 A 11/1960 Watts
3,708,852 A 1/1973 Mason
3,898,724 A 8/1975 Conorich
3,997,956 A * 12/1976 McKee ...................... 29/564.1
4,070,755 A 1/1978 Carter
4,161,061 A 7/1979 Mason et al.
4,241,496 A 12/1980 Gregson
4,271,573 A 6/1981 von Roesgen
4,299,021 A * 11/1981 Williams ................... 81/177.2
4,380,118 A * 4/1983 Driver et al. ................. 29/758
4,696,090 A 9/1987 Gregson et al.
5,175,921 A 1/1993 Krietzman
5,195,230 A 3/1993 Krietzman
5,604,948 A 2/1997 McMahon et al.
5,628,105 A 5/1997 Fallandy et al.
5,666,715 A 9/1997 Zoiss et al.
5,758,403 A 6/1998 Fallandy
5,813,109 A 9/1998 Ziegler et al.
5,842,268 A 12/1998 Arnfield
5,887,333 A 3/1999 Clark
6,301,772 B1 * 10/2001 Cheng ........................ 29/566.4
6,625,867 B2 * 9/2003 Jonker ........................ 29/566.4
6,704,992 B2 3/2004 Minor
6,860,178 B2 * 3/2005 Wang ........................ 81/177.2
6,976,411 B1 * 12/2005 Yu ............................ 81/177.2
7,013,766 B2 * 3/2006 Lee ......................... 81/177.85
7,096,564 B2 * 8/2006 Sullivan .................... 29/566.4
2004/0173060 A1 * 9/2004 Lee ......................... 81/177.85
2004/0211300 A1 * 10/2004 Wang ........................ 81/177.2

* cited by examiner

*Primary Examiner*—Dana Ross
(74) *Attorney, Agent, or Firm*—Gene W. Arant

(57) ABSTRACT

A tool system for inserting an insulated wire between knife blades of an insulation displacement type electrical connector, in which the reach of the tool is expanded by use of a an extension member easily inserted between a punch down tool and a wire end insert tool.

4 Claims, 2 Drawing Sheets

IDC TOOL WITH EXTENDED REACH

PRIORITY CLAIM

Figures 1A, 1B, 1C, 1D, 1E, 1F:
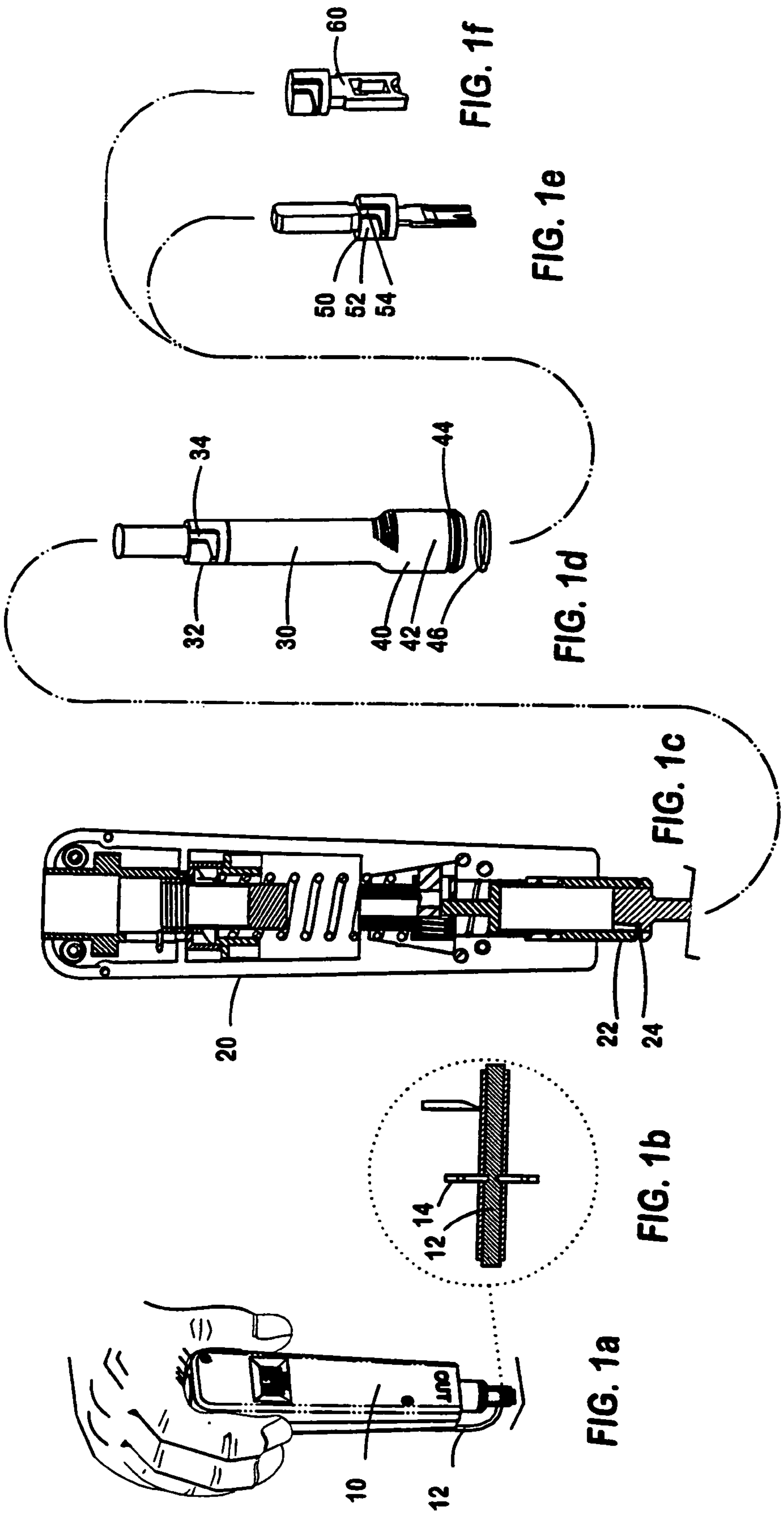

This application claims priority of my Provisional Application No. 60/761,825 filed Jan. 26, 2006.

FIELD OF THE INVENTION

The field of this invention is tools for the electrical communications industry.

BACKGROUND OF THE INVENTION

When installing insulated electrical wires into Insulation Displacement type electrical Connectors (IDCs) it has been a standard practice to use a wire insertion tool blade for pushing the insulated wire down between the pair of knives of the connector. My U.S. Pat. No. 7,096,564 issued Aug. 29, 2006 shows the manner in which the tool blade controls the insertion of an insulated wire into an insulation displacement type electrical connector. The knives then cut through the insulation to make an electrical connection. The wire insert tool blade typically also includes a cutting edge for cutting off a protruding end portion of the wire after it has been inserted, if the wire is to then become electrically terminated at that particular connector.

In the communications industry such wire insert tool blades are commonly referred to as either a 110 Blade, or a 66 Blade, depending upon the type of electrical panel where the installation is being made. One example of a 110 tool blade is shown in my U.S. Pat. No. 7,096,564 issued Aug. 29, 2006. An example of a combination 66-110 blade is shown in my Patent No. Des. 412,431.

Such tool blades are commonly mounted in or upon a punch-down or impact tool, also known as a bayonet type impact tool, which when activated applies a driving impact in a forward direction to the tool blade. The presently standard punch-down tools when activated develop a fixed amount of driving force or impact. However, in my U.S. patent application Ser. No. 11/175,466 filed Jul. 5, 2005, I have shown a low-impact kind of punch-down tool for which the downward driving force can be precisely adjusted or controlled by the operator.

Not only may such punch-down tools need adjustment or control of their driving force, but a further requirement for such tools is convenience for the user. As the connector board technology has progressed the connectors have become more and more crowded and have become difficult to work with.

The electrician or tradesman needs not only adequate working space for manipulating or controlling the tool assembly, but also equally needs adequate visibility of the location where the result of the work takes place. The nature of both those requirements varies somewhat depending upon the type of electrical panel, the type of punch-down tool, and other factors.

SUMMARY OF THE INVENTION

According to the present invention I have determined that an extension device inserted between a punch-down or impact tool and a wire insert blade that is driven by the tool has unexpected benefits for the electrician or tradesman. Not only does it become easier for the tradesman to place the wire insertion blade between the connector knives, but visibility of the work being done is greatly improved, ensuring greater efficiency of the tradesman's work and better performance of the resulting installed product. Also, by the use of this new tool the safety of the technician is improved. The technician can operate a punch-down quite some distance away from the wire termination. The technician is kept away from possible charged electric wires or dark areas where insects may reside, and can clearly view the wires he will be connecting and increasing his stand-off for better focus of his eyes.

DRAWING SUMMARY

Figure 2C:
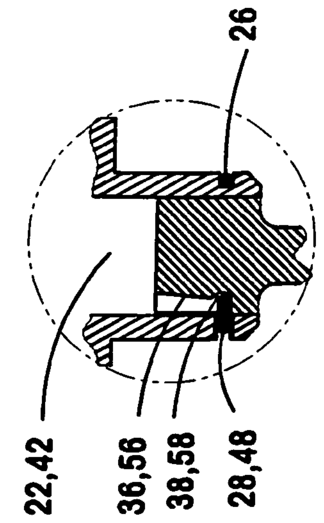
Figure 2B:
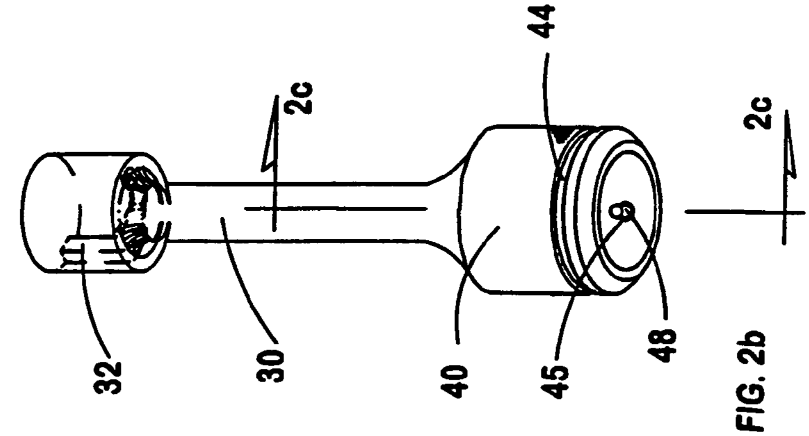
Figure 2A:
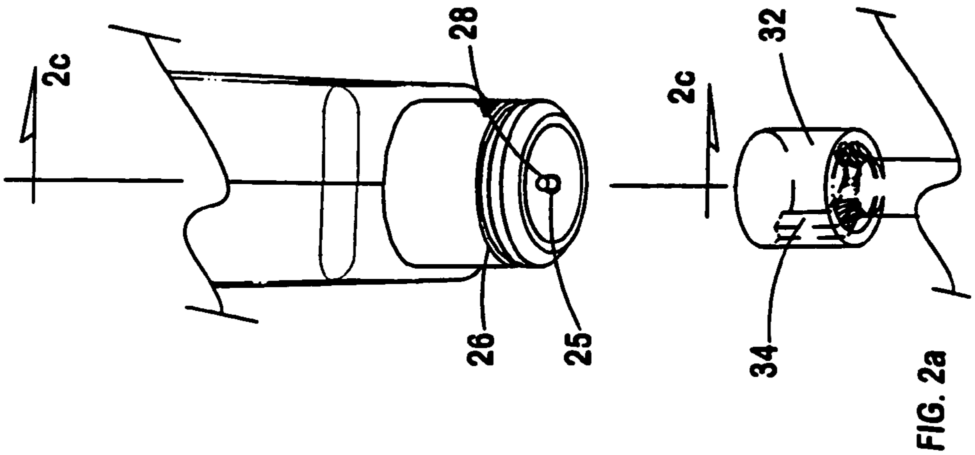

FIG. 1 including separate views 1*a*, 1*b*, 1*c*, 1*d*, 1*e*, and 1*f* is a perspective view of a tool system including a punch-down tool together with my unique tool extension device, and showing how either a 110 blade or a 66 blade may be selectively supported from the tool extension device;

FIG. 2*a* is a perspective view, showing how the upper end of my tool extension device fits into the hollow lower end of a punch-down tool;

FIG. 2*b* is a perspective view of my tool extension device showing both its male upper end and female lower end; and FIG. 2*c* is a fragmentary cross-sectional view showing how the slot and detent of the male connection end of either the extension device or the wire insert tool fits into a hollow female connection on the punch-down tool or extension device, and is locked in place by the associated spring.

DETAILED DESCRIPTION OF PREFERRED EMBODIMENT (FIGS. 1, 2*a*, and 2*b*)

As Shown in the Drawings, a Tool System 10 for inserting an insulated wire 12 into the knife blades 14 of an Insulation Displacement Connector (IDC) includes a punch-down tool 20 whose effective length is extended by use of my novel extension device 30. A wire end insert tool 50 is then securely locked in the lower end of the extension device. A wire end insert tool of the 110 type is shown, for example, in my U.S. Pat. No. 7,096,564.

More specifically, the punch-down tool 20 has a hollow cylindrical lower driving end 22 with a circumferential groove 24 extending about its outer surface. At one point in groove 24 a single hole 25 is formed through the groove wall. A locking spring 26 is disposed within the circumferential groove 24 and extends about most, but not all, of its circumferential length. The spring 26 has an inturned end 28 which extends through the radial hole 25 in order to perform a locking function.

The tool extension device 30 is of elongated and generally tubular configuration, being about one and one half to four inches in length, but preferably about two and a half inches. Extension device 30 has an upper end portion 32 which has, on its exterior surface, a longitudinal slot 34. There is a sloped ramp 36 in the upper end of slot 34. The ramp has a peak at about ¾ or ⅞ of its length. At the lower end of ramp 36 there is a depression 38 forming a detent which extends laterally.

The inturned end 28 of the locking spring 26 on the punch-down tool 20 normally projects through the hole 25 of punch-down tool 20. When the upper end of extension device 30 is to be installed into the punch-down tool 20 the extension device is rotated until the inturned end 28 of locking spring 26 of punch-down tool 20 enters the upper end of ramp 36 on the extension device. Then the two parts are longitudinally moved together in a telescoping movement. After the spring end 28 passes the peak of ramp 36 and moves on down, it engages the depresssion or detent 38 and the two devices become locked together, both rotationally and longitudinally.

The lower driving end 40 of extension device 30 has a hollow cylindrical wall 42, and a circumferential groove 44 on its outer surface. A single radial hole 45 is formed at one point in the wall of circumferential groove 44. A locking spring 46 extends about most of the circumference of lower driving end 40, within the groove 44, and has an in-turned end 48 which normally extends through hole 45 to provide a locking function.

A wire end insert tool 50 of the 110 type has an upper end portion 52 with a longitudinal slot 54 formed in its exterior surface. The upper end of slot 54 has a sloped ramp 56. A detent is formed in the laterally extending lower end portion 58 of ramp 56.

The inturned end 48 of the locking spring 46 on the tool extension device 30 normally projects through the hole 45. As indicated in FIGS. 1*d* and 1*e*, the upper end portion 52 of wire end insert tool 50 may be inserted into the hollow lower driving end 40 of the tool extension device 30. The parts are rotated so that inturned end 48 of the locking spring 46 on the tool extension device 30 may enter the upper end of ramp 56 on the insert tool. Then the two parts are longitudinally moved together in a telescoping movement. After the spring end 48 passes the peak of ramp 56 and moves on down, the wire insert blade engages the depression or detent 58, it is further rotated, and the two devices are then locked together, both rotationally and longitudinally.

ALIGNMENT. The extension device may be arranged, as shown, so that in the operative position of the tool system the cut side of the punch-down tool remains aligns with the cut side of the wire insert tool.

Thus I have provided a tool system with an extended reach for selectively inserting an insulated wire between the knife blades of an insulation displacement type electrical connector. The tool system includes a punch-down tool with a hollow lower driving end which forms the female part of a mechanical connector. An extension device of generally tubular configuration is about one and one half to four inches in length and has an upper end portion which forms the male part of a mechanical connector. The upper end portion of the extension device may be inserted into the hollow lower driving end of the punch-down tool so as to lock the extension device both rotationally and longitudinally relative to the punch-down tool. The lower end portion of the extension device has a hollow lower driving end which forms the female part of a mechanical connector. A wire end insert tool has an upper end portion which forms the male part of a mechanical connector. The male connector of the wire end insert tool may be inserted into the female connector of the extension device to lock the wire end insert tool both rotationally and longitudinally relative to the punch-down tool. As shown in FIGS. 1*e* and 1*f*, the tradesman may use either the 110 type wire insert tool 50 of the 66 type wire insert tool 60.

EASE OF USE. My improved tool system allows the electrician or tradesman a complete range of choice for his tools. He can conveniently carry two or more extension devices that are of differing lengths. When an extension device is not needed the tool may be disassembled by pulling the part longitudinally. In-turned wire ends can be pulled out of their respective radial holes. Then the wire insert tool can be re-connected to the punch-down tool. As shown in FIGS. 1*e* and 1*f*, he may use either a type 110 blade (reference No. 50) or a type 66 blade (reference No. 60).

SAFETY. My improved tool system allows the tradesman or electrician to clear his view of the work area by positioning his physical body parts away from the termination. This improved tool system keeps his hands away from the electrical termination and allows better vision of the work area by adding distance between the technician's eyes and the electrical termination on which he is working.

ALTERNATE FORMS. While I have shown a simple basic form of my extension device, it is also possible to have an extension device in two parts fastened together on a screw thread, which could then be rotated to enlarge or reduce the length of the extension device. Other types of extension methods are ball detents, or telescoping mechanisms, some of which were shown in my Provisional Application. While my extension device is preferably made as an integral metal part, it is also possible to use a plastic material, either entirely or in conjunction with a metal part. Other modifications may be apparent to persons skilled in the art.

SCOPE OF PROTECTION. While I have disclosed in detail the presently preferred embodiment of my invention, it be understood that the scope of my invention is defined only in the appended claims.

I claim:

1. An extension device for a punch-down tool to support a wire insert tool in an extended position and locked against both rotational and longitudinal movement, comprising:

an elongated generally tubular body having a length of about one and one-half to four inches;

the body having a lower driving end with a hollow cylindrical configuration upon whose outer surface a circumferential groove is formed, having a locking spring carried in the circumferential groove which extends around most but not all of the circumference of the driving end, and having at one point in the circumferential groove a single hole through the wall of the body, the spring also having an in-turned end which is adapted to engage the hole and become locked in it; and the upper end of the elongated body having formed in its exterior surface a longitudinal slot whose upper end portion is sloped to provide a ramp, the ramp having a peak, and whose lower end portion is indented to form a detent;

such that if the upper end of the elongated body could be inserted into its own hollow lower end, the longitudinal slot would then receive and engage the inturned end of the spring, and when the spring end point passed the peak of the ramp it would then drop down into the detent and the two end portions of the tubular body would then be locked in place both rotationally and longitudinally relative to each other.

2. A tool system for inserting an insulated wire between the knife blades of an insulation displacement connector, comprising:

a punch-down tool having a hollow cylindrical lower driving end upon whose outer surface a circumferential groove is formed;

a locking spring disposed within the circumferential groove and extending around most but not all of the circumference of the driving end and having an inturned locking end which engages a hole in the groove wall;

an extension device of generally tubular configuration, having an upper end portion in whose exterior surface a longitudinal slot is formed, the slot having an upper end portion sloped to provide a ramp, its lower end portion being indented to form a detent;

the upper end of the extension device being inserted into the hollow cylindrical lower driving end of the punch-down tool such that the longitudinal slot in the extension device then receives and engages the inturned end of the spring on the punch-down tool so as to lock the extension device both rotationally and longitudinally relative to the punch-down tool;

the lower end portion of the extension device having a hollow cylindrical lower driving end with a circumferential groove formed upon its outer surface, and having a locking spring extending around most but not all of the circumference of the driving end, the extension device having at one point in its circumferential groove a single hole engaged by the in-turned end of the spring;

a wire end insert tool having an upper end portion in whose exterior surface a longitudinal slot is formed, the slot being sloped and its lower end portion indented to form a detent; and the upper end portion of the wire end insert tool being inserted into the hollow lower driving end of the extension device such that the longitudinal slot in the wire end insert tool then receives and engages the inturned end of the spring on the extension device, which then locks the wire end insert tool both rotationally and longitudinally relative to the punch-down tool.

3. A tool system with an extended reach for selectively inserting an insulated wire between the knife blades of an insulation displacement type electrical connector, comprising:

a punch-down tool having a hollow cylindrical lower driving end which forms the female part of a mechanical connector;

an extension device of generally tubular configuration about one and a half to four inches in length, having an upper end portion which forms the male part of a mechanical connector;

the upper end portion of the extension device being inserted into the hollow cylindrical lower driving end of the punch-down tool so as to lock the extension device both rotationally and longitudinally relative to the punch-down tool;

the lower end portion of the extension device having a hollow cylindrical lower driving end which forms the female part of a mechanical connector;

a wire end insert tool having an upper end portion which forms the male part of a mechanical connector; and the male connector of the wire end insert tool being inserted into the female connector of the extension device to lock it both rotationally and longitudinally relative to the punch-down tool.

4. A tool system as in claim 3 wherein in its operative position the cut side of the punch-down tool remains aligned with the cut side of the wire insert tool.

* * * * *